(12) United States Patent
Itoh et al.

(10) Patent No.: US 7,446,953 B2
(45) Date of Patent: Nov. 4, 2008

(54) IMAGING LENS, IMAGE READING APPARATUS AND IMAGE FORMING APPARATUS

(75) Inventors: Masahiro Itoh, Sagamihara (JP); Kiichiro Nishina, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 62 days.

(21) Appl. No.: 11/710,444

(22) Filed: Feb. 26, 2007

(65) Prior Publication Data

US 2007/0206296 A1    Sep. 6, 2007

(30) Foreign Application Priority Data

Mar. 6, 2006    (JP)    ............... 2006-060046

(51) Int. Cl.
*G02B 9/00*    (2006.01)
(52) U.S. Cl. ....................... 359/738; 359/739
(58) Field of Classification Search ............ 359/738, 359/739, 740
See application file for complete search history.

(56) References Cited

FOREIGN PATENT DOCUMENTS

| JP | 63-165642 U | 10/1988 |
|---|---|---|
| JP | 63-314528 A | 12/1988 |
| JP | 64-003840 U | 1/1989 |
| JP | 02-308273 A | 12/1990 |
| JP | 06-109971 A | 4/1994 |
| JP | 09-153980 A | 6/1997 |
| JP | 09-230513 A | 9/1997 |
| JP | 10-068881 A | 3/1998 |
| JP | 10-155058 A | 6/1998 |
| JP | 10-253881 A | 9/1998 |
| JP | 11-109221 | 4/1999 |
| JP | 11-1092211 A | 4/1999 |
| JP | 11-146139 A | 5/1999 |
| JP | 2000-332967 A | 11/2000 |
| JP | 2001-166359 A | 6/2001 |
| JP | 2001-251475 A | 9/2001 |
| JP | 2001-350073 A | 12/2001 |
| JP | 2002-082282 A | 3/2002 |
| JP | 2002-101263 A | 4/2002 |
| JP | 2002-244007 A | 8/2002 |
| JP | 2002-350604 A | 12/2002 |
| JP | 2004-109543 A | 4/2004 |
| JP | 2004-109793 A | 4/2004 |
| JP | 2004-304686 A | 10/2004 |
| JP | 2005-159773 A | 6/2005 |
| JP | 2005-292353 A | 10/2005 |
| JP | 2006-174382 A | 6/2006 |
| JP | 2006-211251 A | 8/2006 |
| JP | 2006-222917 A | 8/2006 |
| JP | 2006-323288 A | 11/2006 |
| JP | 2007-74020 | 3/2007 |
| JP | 2007-101827 | 4/2007 |

*Primary Examiner*—Timothy J Thompson
(74) *Attorney, Agent, or Firm*—Harness, Dickey & Pierce, P.L.C.

(57) ABSTRACT

An imaging lens with a perfect imaging quality and a low manufacture cost is provided for using in an image reading apparatus or an image forming apparatus by controlling a surface shape error thereof in a predetermined range disclosed by the present invention. The imaging lens includes a plurality of lenses, and an aperture stop, wherein a vertical interval between a convex in one direction with respect to a lens surface and a concave in the other direction reverse to the one direction on at least one surface of a lens disposed adjacent to the aperture stop is controlled not greater than ½ with respect to a wavelength in a wave range used, the vertical interval is a surface shape error which is set as a deviation between the lens surface and a proximal spherical surface thereof.

10 Claims, 13 Drawing Sheets

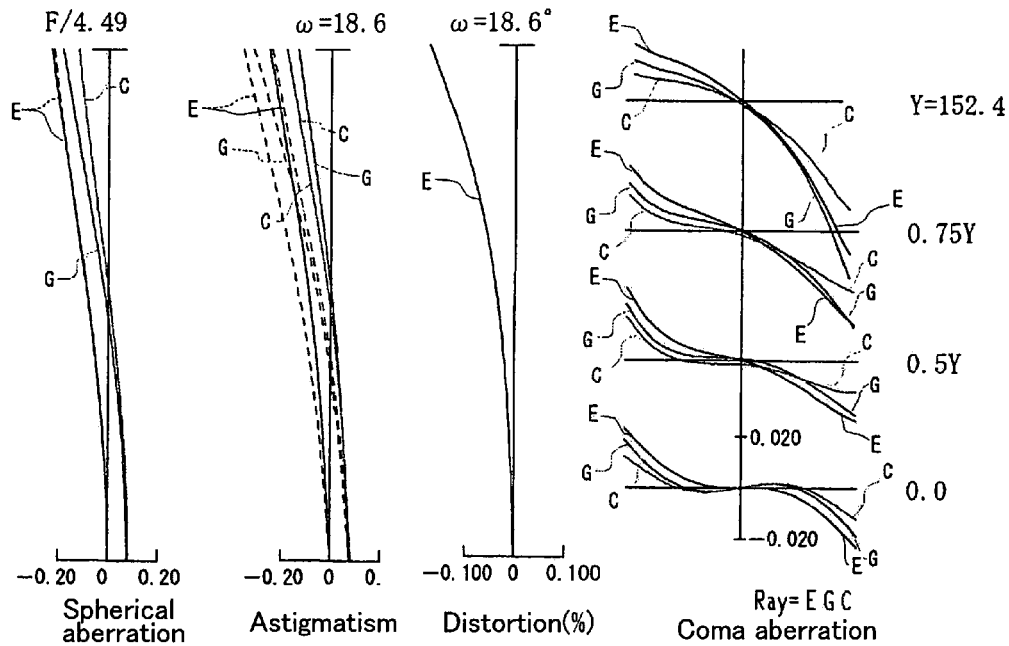
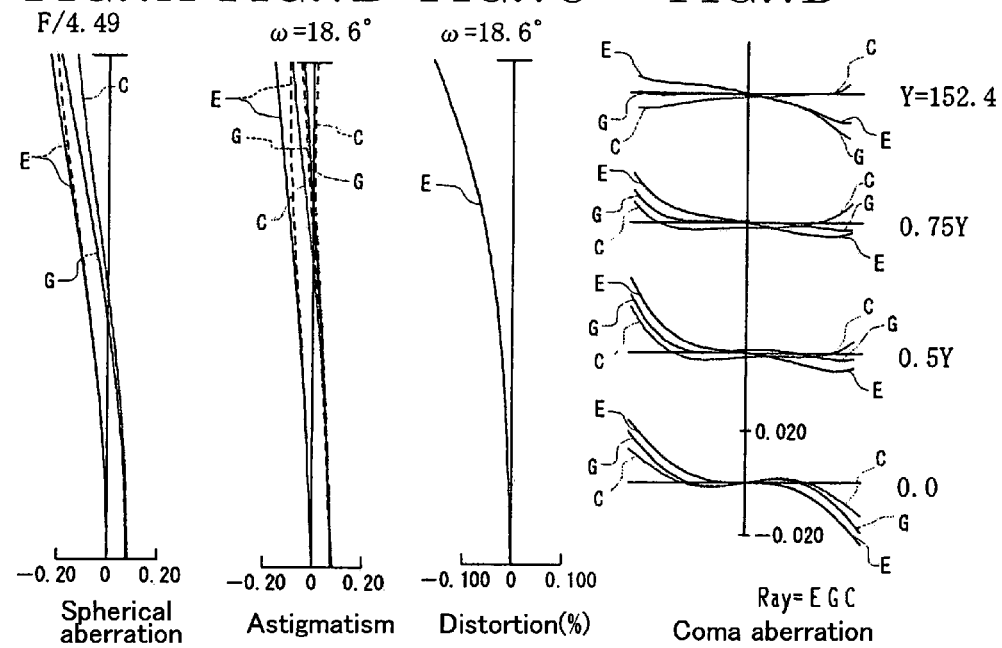

IMAGING LENS, IMAGE READING APPARATUS AND IMAGE FORMING APPARATUS

CROSS-REFERENCE TO THE RELATED APPLICATION

The present application claims the priority benefit of Japanese Patent Application No. 2006-060046 filed on Mar. 6, 2006, the contents of which are incorporated herein by reference in its entirety.

BACKGROUND OF THE INVENTION

1. Field of the Invention

The present invention relates to an imaging lens, an image reading apparatus and an image forming apparatus, which includes the imaging lens.

2. Description of Related Art

An image reading section or an image scanner for a facsimile or a digital copying machine digitalizes a draft image by reading the image information with an imaging lens and forming a reduced image on a solid photographing element, such as a CCD.

In order to read the draft image in full color, there has been an optical system which digitalizes a color image by using a 3-line CCD which has for example, light receiving elements with red, green and blue filters arranged in 3 lines in a chip to separate chromatically the draft image formed on a light receiving surface of the CCD into 3 elementary colors.

Generally, it is required for the imaging lens to have a high contrast at a high spatial frequency region in a field surface and a vignetting factor, in other words, aperture efficiency close to 100%.

Furthermore, in order to read the draft image in full color perfectly, a chromatic aberration correction must be performed correctly to align each imaging position with red, green or blue color on an imaging surface along an optical axis of the imaging lens.

Therefore, it is necessary to control a curvature of field of the imaging lens as far as possible in order to obtain an imaging quality uniform for an image with various image heights from a paraxial domain to the margins.

There has been disclosed conventionally a Gaussian lens having a 6-lens in 4-group configuration as an imaging lens in Japan Patent Laid-Open No. H6-109971, H10-68881, H10-253881 and H11-109221.

It is possible for the Gaussian imaging lens to correct the curvature of field within a field angle up to 20°, and even to inhibit a coma flare at a relatively greater lens diameter. However, a relatively greater lens diameter will inevitably cause a greater outer lens dimension, and accordingly, there is a limitation to miniaturize the Gaussian imaging lens or an apparatus applying the Gaussian imaging lens thereon and to reduce a manufacture cost, since the Gaussian imaging lens is made from lenses as many as 6 pieces.

Furthermore, it is difficult to assure an imaging quality of the Gaussian reading lens made from only spherical lenses when a reading resolution is for example as high as 600 dpi and a line sensor has a resolution power as small as for example 4.7 µm per pixel.

For a lens, an aberration of the curvature of field may vary according to a manufacture error on parameters such as a radius of curvature, a lens thickness and a lens interval etc., and as a result it is impossible to obtain a uniform imaging quality for an image with various image heights from the paraxial domain to the margins. In order to counteract the variation for each parameter so as to ensure the imaging quality, it is necessary to select and combine lenses with different thickness, or change spatial intervals between lenses.

Therefore, there has been disclosed in Japan Patent Laid-Open No. 2004-304686 a novel lens in which an aspherical lens is adopted in order to improve the imaging quality.

However, when there is a surface shape error to some extent occurred on a lens, it is impossible to be corrected simply by lens selection or lens interval adjustment. Herein the surface shape error is defined as a deviation between a surface shape of a lens and a proximal spherical surface thereof.

SUMMARY OF THE INVENTION

A main object of the present invention is to provide an imaging lens, which performance deteriorating factors resulted from a manufacture error are inhibited as far as possible and thus has a perfect imaging quality and a low manufacture cost, and an image reading apparatus and an image forming apparatus.

Furthermore, another object of the present invention, on considering the global environment, is to provide an imaging lens including at least one aspherical lens, which is chemically stable and made from an optical glass containing no harmful substances such as lead or arsenic. Thus it is possible to recycle the optical glass material, avoid contaminating water in manufacture, and it is also possible to reduce numbers of lenses used by adopting the aspherical lens and accordingly reducing the optical glass material and energy which are consumed in manufacture.

To attain the objects described above, there is provided an imaging lens according to the present invention including a plurality of lenses, and an aperture stop. A vertical interval between a convex in one direction and a concave in a reverse direction thereto on at least one surface of a lens disposed adjacent to the aperture stop is controlled not greater than ½ with respect to a wavelength in a wave range used, providing that a surface shape error as a deviation between a surface shape of a lens and a proximal spherical surface thereof.

BRIEF DESCRIPTION OF THE DRAWINGS

FIG. 6A to FIG. 6D are aberration diagrams after a manufacture error.

FIG. 7A to FIG. 7D are aberration diagrams after an interval is adjusted.

DETAILED DESCRIPTION OF THE PREFERRED EMBODIMENTS

Hereinafter, an embodiment of an imaging lens, an image reading apparatus and an image forming apparatus according to the present invention will be explained in detail.

In the embodiment, an aspherical lens, in other words a mold aspherical lens on which an aspherical surface is directly molded, is used as an example. A hybrid lens, that is, a thin resin layer is disposed on a spherical lens surface to provide an aspherical surface, is also preferred.

Figure 1:
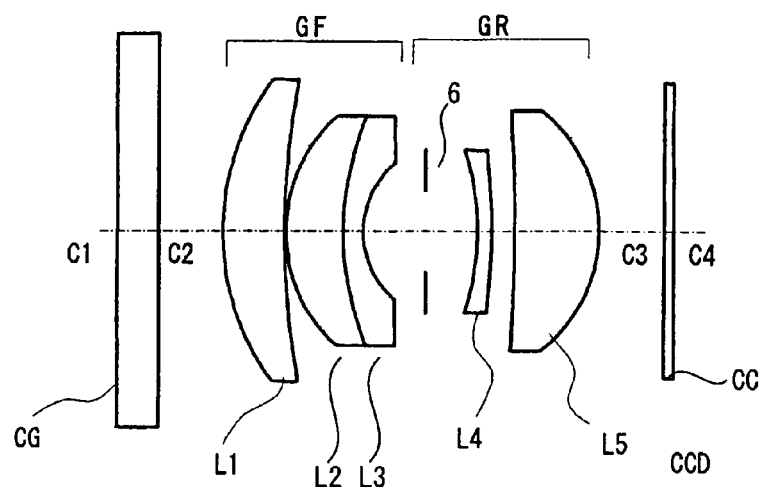
FIG. 1 is a pattern diagram illustrating one example of an imaging lens according to the present invention.

FIG. 1 illustrates one example of the imaging lens of the present invention.

In FIG. 1, starting from an object side to an image side of the imaging lens, optical elements making up an optical system of the imaging lens include sequentially a contact glass CG which holds an object for example a draft image, a first lens L1, a second lens L2, a third lens L3, a aperture stop 6, a fourth lens L4, a fifth lens L5 and a CCD cover glass CC. An image is formed on a CCD input image surface at the back of the CCD cover glass CC.

The first lens L1 and the second lens L2 are a positive meniscus lens having a convex surface to the object side. The third lens L3 is a negative meniscus lens having a strong concave surface toward the image side.

The first lens L1, the second lens L2 and the third lens L3 form a front group GF.

The fourth lens L4 is a negative meniscus lens having a convex aspherical surface toward the image side. The fifth lens L5 is a positive meniscus lens having a strong convex surface toward the image side. The fourth lens L4 and the fifth lens L5 form a rear group GR.

It is possible for the imaging lens of the present invention having the above mentioned 5-lens in 4-group configuration to obtain an imaging quality equivalent to that of a Gaussian lens having a 6-lens in 4-group configuration.

In general, a lens disposed adjacent to an aperture stop performs a spherical aberration correction. Thus if a radius of curvature thereof is deviated from a designed value, the spherical aberration may be corrected through lens selection and lens interval adjustment. While for the lens disposed adjacent to the aperture stop, other than the radius of curvature deviated from a designed value, a surface shape error, in other words, a deviation between a surface shape of a lens and a proximal spherical surface thereof will make the spherical aberration vary significantly which is impossible to be corrected only by lens selection and spatial interval adjustment.

In the present embodiment, the surface shape error is defined as a vertical interval between a convex above the proximal spherical surface and a concave below the proximal spherical surface, i.e. the convex and the concave have different directions with respect to the proximal spherical surface.

Therefore, in order to ensure an imaging quality, it is necessary to inhibit the surface shape error of the lens disposed adjacent to the aperture stop. In the present invention, the surface shape error is controlled not greater than ½, in detail, a vertical interval between a convex in one direction and a concave in a reverse direction thereto on the surface 8 of the fourth lens L4 is controlled not greater than ½ with respect to a wavelength in a wave range used.

If a radial interval DL between a convex in one direction and a concave in a reverse direction thereto on a lens disposed adjacent to the aperture stop is smaller than about ½ of a diameter of a light flux, the imaging quality will be seriously deteriorated by the surface shape error.

On the other hand, if the above value is smaller than ⅕, the surface shape error will almost not affect the imaging quality. The diameter of the light flux passing the lens disposed adjacent to the aperture stop is roughly equal to the aperture stop diameter DS. Thus, it is possible to exclude the surface shape error which will not affect the imaging quality by setting the surface shaper error with respect to the aperture stop diameter in a suitable range.

Therefore, the vertical interval for the surface 8 of the fourth lens L4 is controlled not greater than ½ with respect to a wavelength in the wave range used with the proviso that a ratio of DL and DS meets a mathematical expression (1):

$$0.2 < DL/DS < 0.5 \qquad (1)$$

Generally for an imaging lens to read a draft perfectly, it is ideal for a light amount to be distributed evenly at the lens surface. Light deterioration to a serious extent will cause problems such as a scumming in the margins. Therefore it is a common way to shield the light flux along an optical axis via mechanical shading by using for example a shielding plate to make the light amount unevenly distributed at the lens surface, or to increase electrically the output in the margins via electrical shading.

However, if the vignetting factor for the lens is too small, there is a need to shield greater amount of light flux along the optical axis via mechanical shading, which as a result leads to a substantial reduction of the light amount, or too much noises occurred in the margins. Thus it is necessary to ensure the vignetting factor of a lens at about 100% and inhibit only those light amounts according to cosine fourth law with respect the optical axis.

Thus, the imaging lens according to the present invention in another embodiment has a vignetting factor close to 100%.

Furthermore, the imaging lens according to the present invention includes a plurality of lenses made from glass containing no harmful substances such as lead or arsenic.

Since all the lenses are made from the optical glass which is chemically stable and containing no harmful substances such as lead or arsenic, it is possible to recycle the optical glass material and to prevent waste fluids from contaminating water in manufacture. In addition, since numbers of lenses used are reduced from the conventional 6 pieces to the present 5 pieces, it is possible to save energy and reduce $CO_2$ generated in manufacture and as a result it is possible to make available a size-reduced imaging lens at a low cost.

Figure 2:
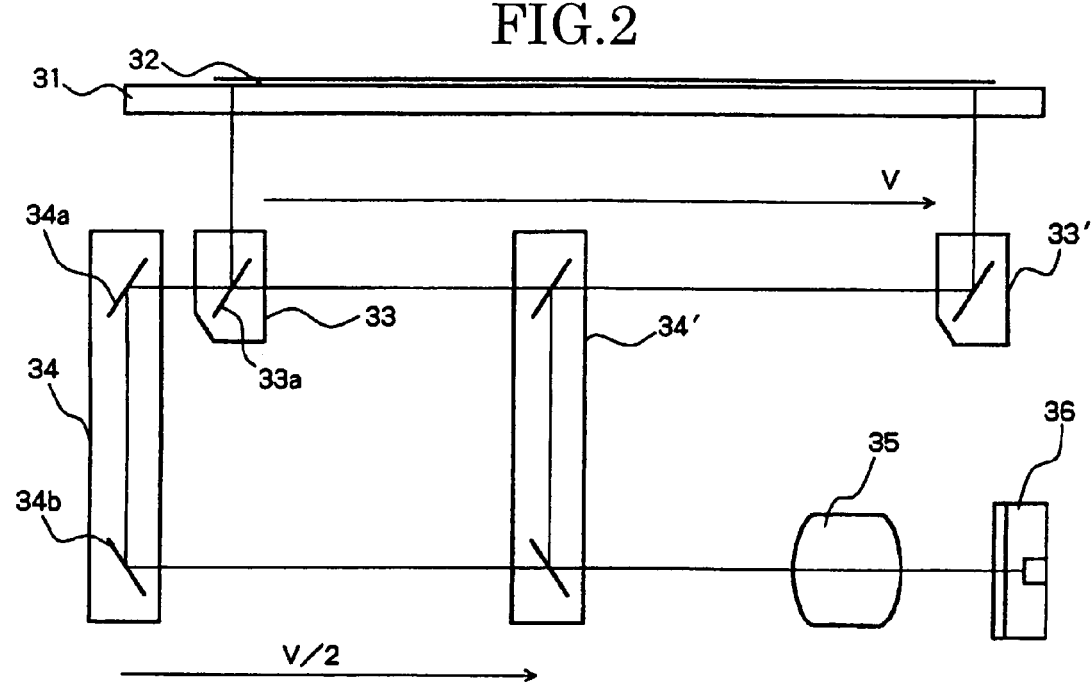
FIG. 2 is a pattern diagram illustrating one example of an image reading apparatus according to the present invention.

FIG. 2 illustrates one example of an image reading apparatus. The imaging lens according to the present invention is used thereon as an image reading lens.

As an illumination source for the image reading apparatus, a halogen lamp, a mercury lamp, or a xenon lamp is commonly used.

As shown in FIG. 2, a draft 32 is disposed on a contact glass 31 and illuminated by an illumination optical system (not illustrated) disposed under the contact glass 31. A reflected illumination light from the draft 32 is reflected by a first mirror 33a of a first moving body 33, and then the light is reflected by first mirror 34a and a second mirror 34b of a second moving body 34, guided to a reducing imaging lens 35, and formed into a reduced image on a line sensor 36.

When reading the draft 32 longitudinally, the first moving body 33 is moved to a position 33' at a speed V and at the same time the second moving body 34 is moved to a position 34' at a speed ½V, thus the draft 32 is read completely.

The image reading apparatus according to the present invention can read the draft information in full color.

Color separation may be achieved by such as a color separation method by selectively inserting color separation prisms or filters between the imaging lens and the CCD to separate a light into R, G, B colors, for example, a method for illuminating a draft by sequentially lighting R, G, B light sources; or a method by using a 3-line CCD which has for example, light receiving elements with R, G and B filters arranged in 3 lines in a chip to chromatically separate the draft image formed on a light receiving surface of the CCD into 3 elementary colors.

Figure 3:
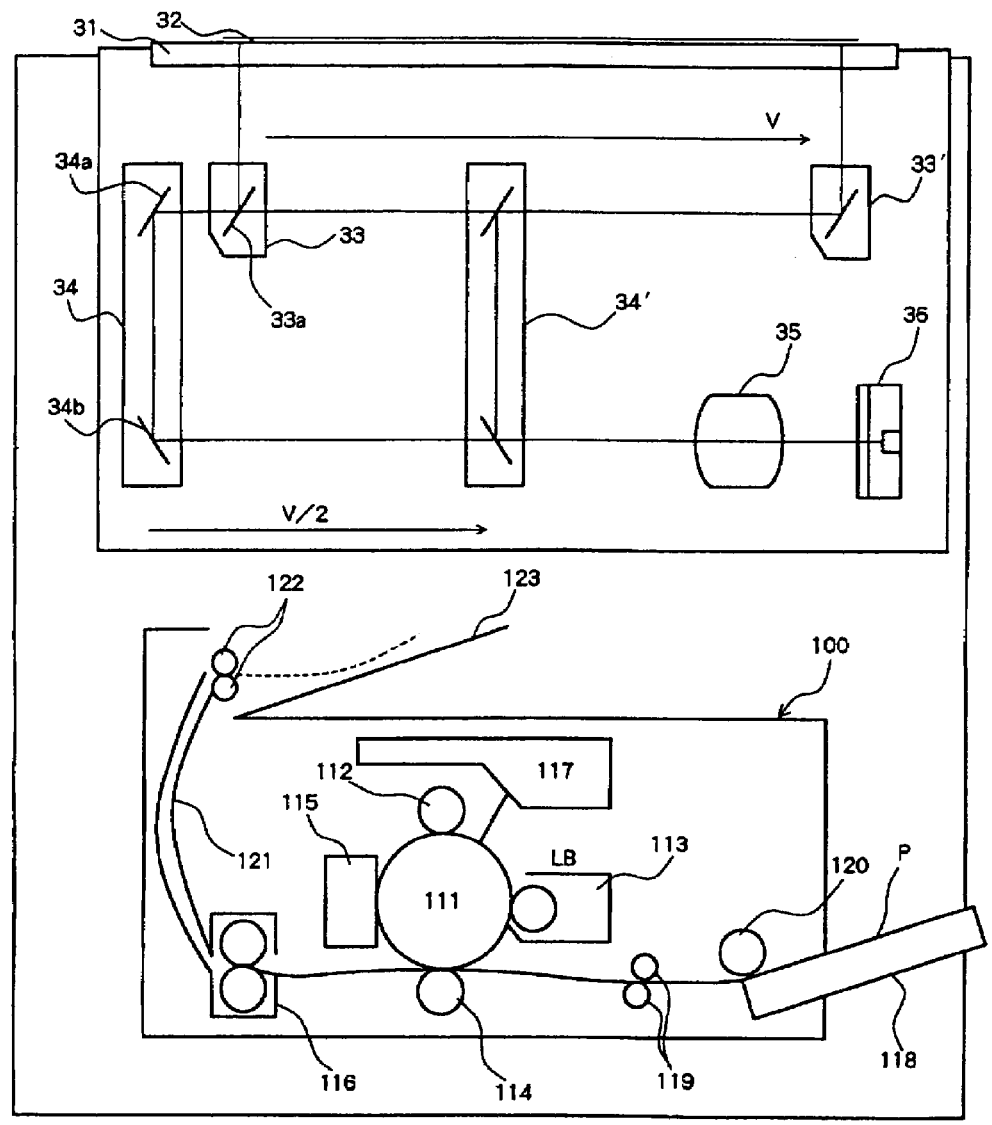
FIG. 3 is a pattern diagram illustrating a laser printer as one example of an image forming apparatus according to the present invention.

FIG. 3 illustrates a pattern diagram of a laser printer used as one example of the image forming apparatus according to the present invention. Since an image reading section included in the image forming apparatus is the same as that illustrated in FIG. 2, descriptions thereof are omitted.

The laser printer includes a cylindrical photo-conductive photoreceptor used as a latent image carrier 111. A charge roller 112 as a charging device, a developing device 113, a transfer roller 114 and a cleaning device 115 are disposed surrounding the latent image carrier 111. A corona charger may also be used as the charging device.

Furthermore, a photo-scanning device 117 is also provided to perform a photo scan with a laser beam LB. The photo-scanning device 117 performs a photo-writing based exposure between the charge roller 112 and the developing device 113. Numerals 116, 118, 119 and 120 represent a fixing device, a cassette, a register roller pair and a paper delivering roller, respectively. Numerals 121, 122 and 123 stand for a transfer path, a paper ejecting roller pair and a tray, respectively. A numeral P represents a transfer paper used as a recording media.

To perform an image formation, the image carrier 111 is rotated clockwise in the figure at a constant speed. A surface thereof is charged uniformly by the charge roller 112 and receives exposure based on writing from the laser beam LB of the photo-scanning device 117 to form a latent image. The formed latent image is the so called negative image, whose image portion is exposed. The latent image is transversely developed by the developing device 113 to form a toner image on the image carrier 111.

The cassette 118 houses the transfer paper P and is attachable to or detachable from the image forming apparatus 100. In an attached state as illustrated in the figure, the transfer paper P is delivered piece by piece by the paper delivering roller 120.

An end portion of the delivered transfer paper P is sandwiched by the register roller pair 119. The register roller pair 119 delivers the transfer paper P to a transfer portion at a timing synchronizing to that when the toner image on the image carrier 111 is being transferred to a transfer position. The delivered transfer paper P is overlapped with the toner image in the transfer portion, and then the toner image is electrostatically transferred to the transfer paper P through the transfer roller 114. The transfer paper P with the toner image transferred is sent to the fixing device 116 to be fused and then passes through the transfer path 121 and ejected by the paper ejecting roller pair 122 out to the surface of the tray 123.

Figure 8A:
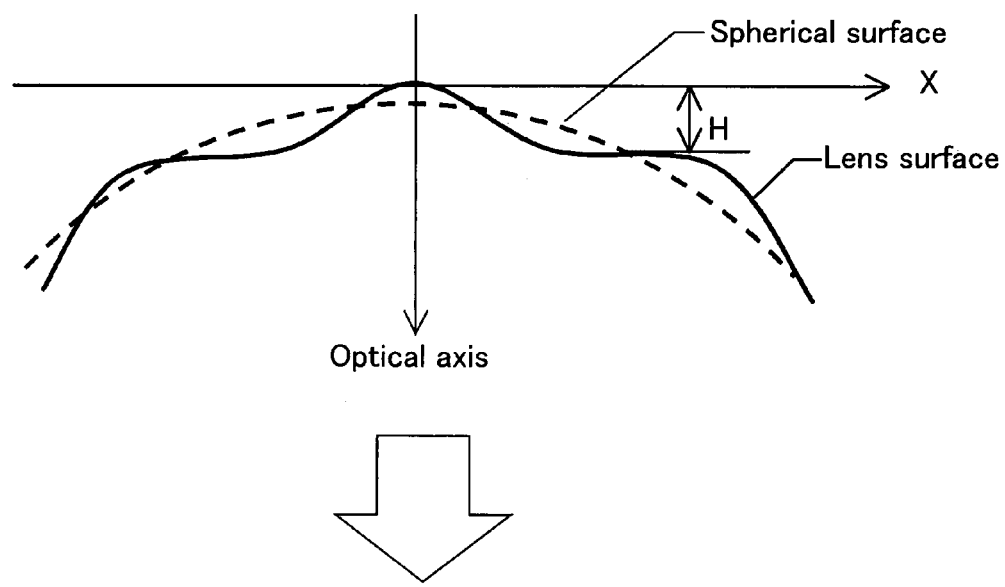
FIG. 8A is an explanation diagram illustrating a sectioned central portion in order to explain a surface shape error of an imaging lens according to the present invention.

An aspherical surface of the imaging lens in FIG. 8A is defined by the following mathematical aspherical equation (2):

$$H = \frac{C \times X^2}{1 + \sqrt{1 - (1+K) \times C^2 \times X^2}} + A_4 \times X^4 + A_6 \times X^6 + A_8 \times X^8 + A_{10} \times X^{10} \qquad (2)$$

Wherein, H is a height from a vertex of the imaging lens to a corresponding radial position X from the optical axis, C represents a lens curvature, K is aspherical conical constant, and $A_4$, $A_6$, $A_8$ and $A_{10}$ represent the $4^{th}$, $6^{th}$, $8^{th}$ and $10^{th}$ order aspherical coefficients, respectively.

Figure 4:
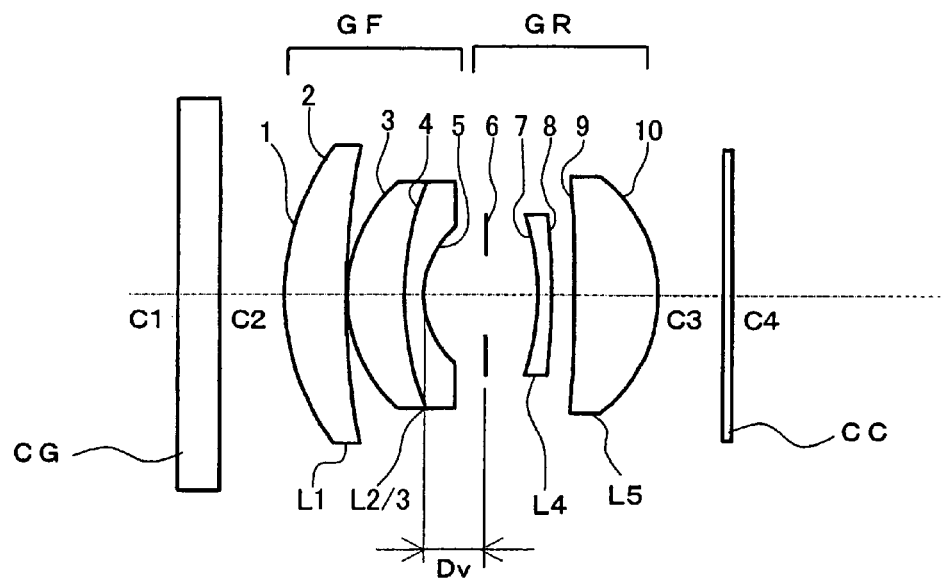
FIG. 4 is a pattern diagram illustrating one embodiment of the imaging lens according to the present invention.
Figures 5A, 5B, 5C, 5D:
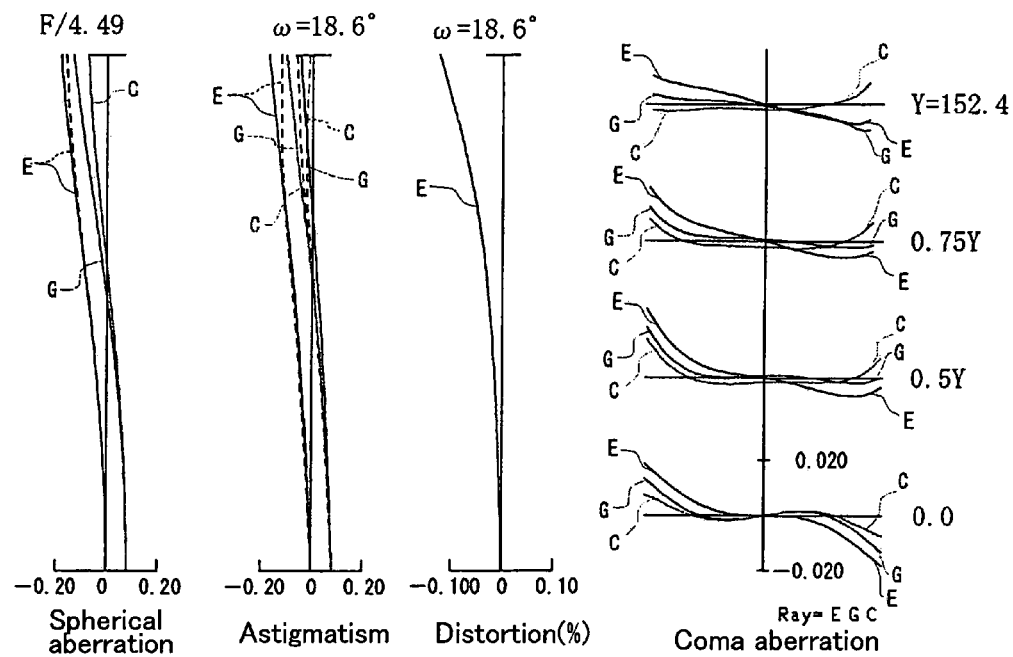
FIG. 5A to FIG. 5D are aberration diagrams for designed values.

FIG. 4 illustrates another example of the imaging lens according to the present invention. Major optical surfaces thereof are numbered with surface numbers, respectively.

The imaging lens has a 5-lens in 4-group configuration including a first group which has a positive meniscus first lens L1 with its convex surface 1 facing the object side; a second group which has a negative refractive power and is jointed from a positive meniscus second lens L2 with its convex surface 3 facing the object side and a negative meniscus third lens L3 with its convex surface 4 facing the object side; a third group which has a negative meniscus fourth lens L4 with its concave surface 7 facing the object side; and a fourth group which has a positive meniscus fifth lens L5 with its concave surface 9. Moreover, the forth lens L4 has a second aspherical surface 8 toward image side.

Furthermore, numerals C1 and C2 represent respectively a first surface and a second surface of a contact glass CG. Numerals 2 and 5 represent concave surfaces of the first lens L1 and the third lens L3, respectively. A numeral 6 stands for the aperture stop. Numerals C3 and C4 represent respectively a first surface and a second surface of a CCD cover glass CC.

The first lens L1, the second lens L2 and the third lens L3 form a front group GF as a first lens group. The second lens L2 and the third lens L3 are integrally jointed together to form a joint lens L2/3. The fourth lens L4 and the fifth lens L5 form a rear group GR as a second lens group. Each group is supported by a supporting member (not illustrated) to provide an integral move when adjusted.

The front group GF including the first lens L1 and the joint lens L2/3 is supported integrally by the supporting member for the front group GF to move integrally when adjusted by an adjusting distance Dv.

The aperture stop 6 is supported integrally with the rear group GR by the supporting member for the rear group GR.

An example of the imaging lens has lens data as follows (Length dimension is given at millimeters.):

a focal distance of the imaging lens f=45.321,
F number F=4.49,
a magnifying power m=0.11102,
a maximum object height Y=152.4, and
a half field angle ω=18.6°.

All characteristic data for each optical surface are illustrated in Table 1.

The adjusting interval Dv in FIG. 4 is adjusted by −0.17 mm, which means that an original interval is shortened or reduced by 0.17 mm.

As illustrated in aberration diagrams from FIG. 5A to FIG. 7D, it is very clear that when all the parameters are altered according to the manufacture tolerance in relation to the designed value such that the curvature of field, specifically that along the meridian, tilts to the minus direction, as a result the coma aberration becomes seriously bad and thus it is impossible to obtain a perfect imaging quality from paraxial region to the margins.

Therefore, by adjusting the interval between the front group GF having the lens L1 to L3 and the rear group GR having the aperture stop 6 to the lens L5 by −0.17 mm, it is possible to correct the curvature of field almost equivalent to the designed value and as a result the coma aberration may be improved as good as designed.

In such case that when only the curvature radius, lens thickness, lens interval and refraction index are altered, in other words, when the surface shape error is not taken into account, it is possible to correct the curvature of field by adjusting the spatial interval between the front group GF and rear group GR.

TABLE 1

| | r | d | nd | vd | ne | ng | nF | nC | Material(Maker) |
|---|---|---|---|---|---|---|---|---|---|
| C1 | 0.000 | 3.200 | 1.51633 | 64.1 | 1.51825 | 1.52621 | 1.52191 | 1.51386 | SBSL7(OHARA) |
| C2 | 0.000 | | | | | | | | |
| 1 | 18.350 | 4.810 | 1.51823 | 58.96 | 1.52033 | 1.52913 | 1.52435 | 1.51556 | EC3(HOYA) |
| 2 | 58.600 | 0.100 | | | | | | | |
| 3 | 11.390 | 4.400 | 1.72342 | 37.99 | 1.72793 | 1.74793 | 1.73685 | 1.71781 | BAFD8(HOYA) |
| 4 | 22.080 | 1.500 | 1.74077 | 27.76 | 1.74707 | 1.77597 | 1.75976 | 1.73307 | EFD13(HOYA) |
| 5 | 6.630 | 4.770 | | | | | | | |
| 6 | 0.00 | 3.980 | | | | | | | |
| 7 | −19.400 | 1.080 | 1.68893 | 31.16 | 1.69415 | 1.71798 | 1.70463 | 1.68252 | MFD80(HOYA) |
| 8* | −42.780 | 1.760 | | | | | | | |
| 9 | −139.000 | 6.480 | 1.51680 | 64.2 | 1.51872 | 1.52667 | 1.52237 | 1.51432 | BSC7(HOYA) |
| 11 | −11.300 | | | | | | | | |
| C3 | 0.000 | 1.000 | 1.51633 | 64.1 | 1.51825 | 1.52621 | 1.52191 | 1.51386 | SBSL7(OHARA) |
| C4 | 0.000 | | | | | | | | |

Wherein, r is a radius of curvature, d is a lens interval. Nd is a refraction index of d ray and vd is Abbe's constant. ne, ng, nF and nC represent refraction indexes of e ray, g ray, F ray and C ray, respectively.

The eighth surface marked with an asterisk is an aspherical surface. Parameters for the aspherical equation (2) are listed in Table 2.

Hereinafter, the surface shape error and a tolerance thereof according to the present invention are explained.

A docked portion (solid line in FIG. 8B) taken from a portion between a real lens surface (solid line in FIG. 8A) and a proximal spherical surface (dot line in FIG. 8A) is called the

TABLE 2

| Surface No. | K | $A_4$ | $A_6$ | $A_8$ | $A_{10}$ |
|---|---|---|---|---|---|
| 8 | −25.56561 | 9.06106E−06 | 7.22264E−07 | −9.79896E−09 | 8.46917E−11 |

The correction of curvature of field is explained hereinafter.

<Manufacture Tolerance>
Curvature radius: ±3 fringes
Thickness: ±0.03
Lens Interval: ±0.01
Refraction Index: ±0.00050

All parameters are altered within the manufacture tolerance such that the curvature of field tilts to a minus direction.

Figure 8B:
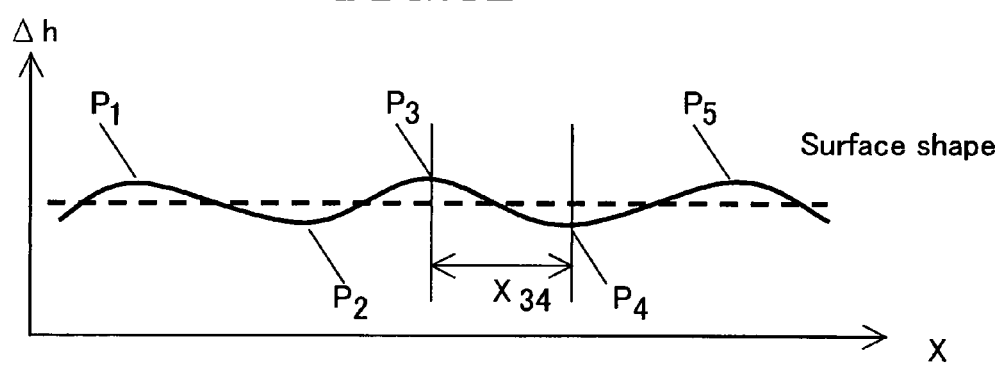
FIG. 8B is a diagram illustrating a difference between a spherical surface and a lens surface.

<Interval Adjust Amount>
Adjusting interval Dv: −0.17 mm surface shape error in the embodiment. In FIGS. 8A and 8B, the lateral axis and vertical axis represent a radial position and a vertical height, respectively.

In FIG. 8B, each of $P_1$, $P_3$ and $P_5$ represents a vertex of a convex, respectively. Each of $P_2$ and $P_4$ represents a lowest point of a concave, respectively. X34 represents an interval of a surface shape error between $P_3$ and $P_4$.

In addition, the proximal spherical surface may be easily obtained from a conventionally known mathematical optimization technique such as the least squares method.

The surface shape error may be determined by an interferometer or a contact/non-contact surface shape meter, but a result of such determination contains a determination noise which leads to a determination error.

Therefore, a mathematical expression (3) of an even function polynomial is applied to remove the determination noise. Also it is possible to use the mathematical expression to extract the surface shape error which contributes to the imaging quality.

$$\Delta H = B_2 X^2 + B_4 X^4 + B_6 X^6 + B_8 X^8 + B_{10} X^{10} + \ldots \quad (3)$$

Wherein, $\Delta H$ represents a height of the surface shape error, X represents a radial distance from the optical axis, and $B_2$, $B_4$, $B_6$, $B_8$ and $B_{10}$ are coefficients for each term respectively.

However, when the lens disposed adjacent to the aperture stop has a surface shape error having an interval smaller than the aperture stop diameter and when the surface shape error is bigger to some extent, it is impossible to perform a good imaging since a wave front of a light flux is distorted by the surface shape error.

As a result, the imaging quality is remarkably deteriorated.

Therefore, within a range roughly equal to the aperture stop diameter near a central portion of the lens disposed adjacent to the aperture stop, it is possible to avoid the imaging quality from deterioration by controlling a ratio of a convex-concave magnitude of the surface shape error with respect to a wavelength of any wave within a wave range used by the imaging lens smaller than ½.

In addition, there is no need to control all the convex-concave magnitude of the surface shape error. It is preferable to control the ratio smaller than ½ when DS and DL meet the mathematical expression (1): 0.2<DL/DS<0.5, setting DL as a convex-concave interval of the surface shape error and DS as the aperture stop diameter.

Figure 9:
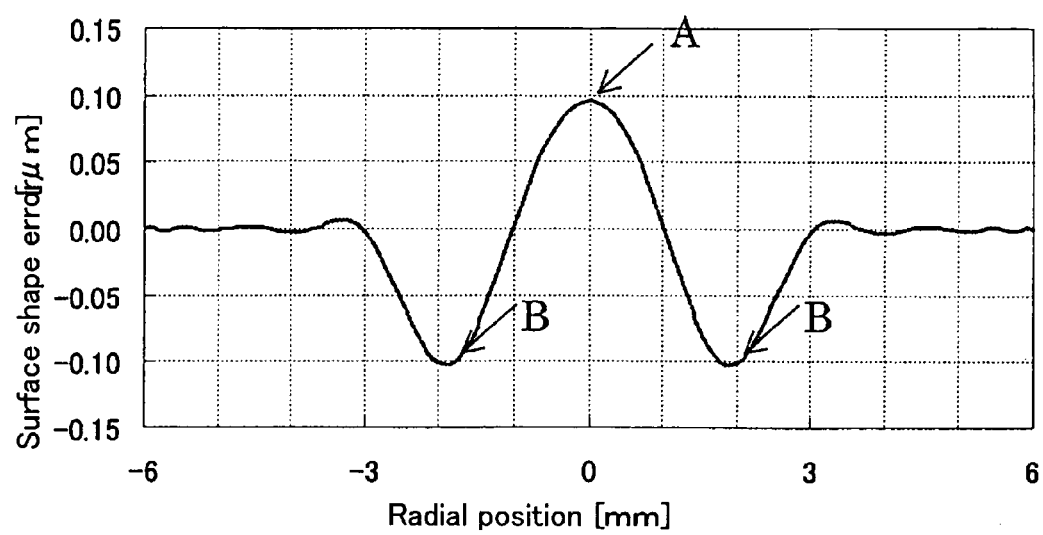
FIG. 9 is a diagram illustrating a $20^{th}$ order even function polynomial of a surface shape error of the $8^{th}$ aspherical lens surface of the lens illustrated in FIG. 4.

If DL/DS is greater than 0.5, it means that an interval between two continuous concaves, in FIG. 9 for example a distance between two concaves B and B is greater than the aperture stop diameter. In other words, it is necessary to control the convex-concave interval which is deemed as the surface shape error by inhibiting DL/DS smaller than 0.5.

If DL/DS is smaller than 0.2, it means that an interval between two continuous concaves, in FIG. 9 for example a distance between two concaves B and B is below 40% of the aperture stop diameter DS, in other words a diameter of light flux passing through the lens. When this percent becomes small to some extent, it is considered that the surface shape error will almost not affect the imaging quality. Thus, it is only necessary to control DL/DS as a surface shape error not smaller than 0.2.

Hereinafter, an explanation concerning the surface shape error is performed on basis of a result of a ray-tracking simulation.

The surface shape error is expressed with the even function polynomial (3) up to the $20^{th}$ order and the imaging quality is evaluated at a MTF (modulation transfer function) with a spatial frequency of 106 lp/mm.

For the lens L4 illustrated in FIG. 4, a characteristic curve of the surface shape error of the $8^{th}$ aspherical surface expressed by the $20^{th}$ even function polynomial is illustrated in FIG. 9. The lateral axis and vertical axis thereof represent a radial position and a surface shape error, respectively. In the figure, a convex-concave interval (a radial distance between A and B) is 1.9 mm and a convex-concave height (a vertical difference between A and B) is 0.2 μm.

Figure 12:
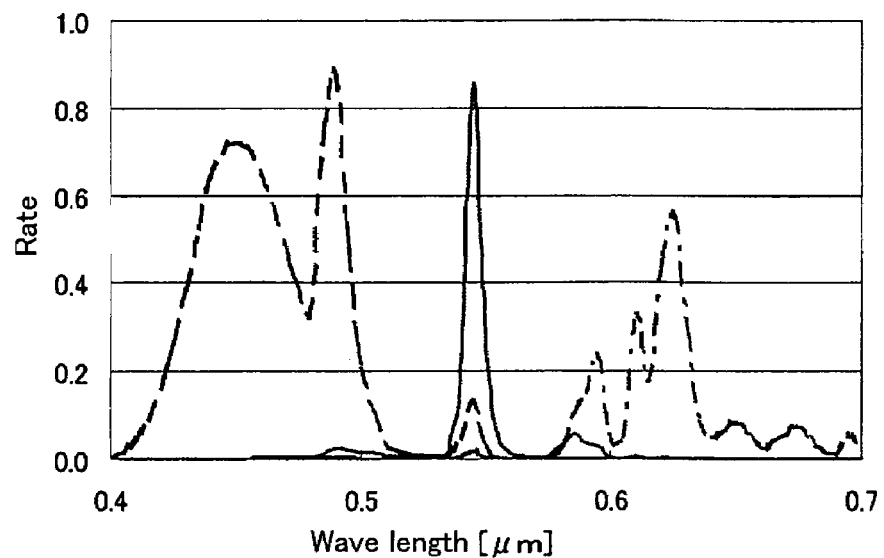
FIG. 12 is a characteristics diagram illustrating one example of a wavelength characteristics combined from an emitting wavelength characteristic of a xenon lamp and a spectral transmission characteristic of a CCD filter for reading an image.

FIG. 12 illustrates a composite curve example for a wavelength characteristic of a xenon lamp and a spectral transmission characteristic of a CCD filter. In the figure, the lateral axis represents a wavelength (μm) and the vertical axis represents a spectral transmission ratio.

In FIG. 12, a wavelength characteristic of a xenon lamp after a blue filter is expressed with a dashed line on the left, a wavelength characteristic of a xenon lamp after a green filter is expressed with a solid line in the middle and a wavelength characteristic of a xenon lamp after a red filter is expressed with a dash-dot line on the right.

Figure 10:
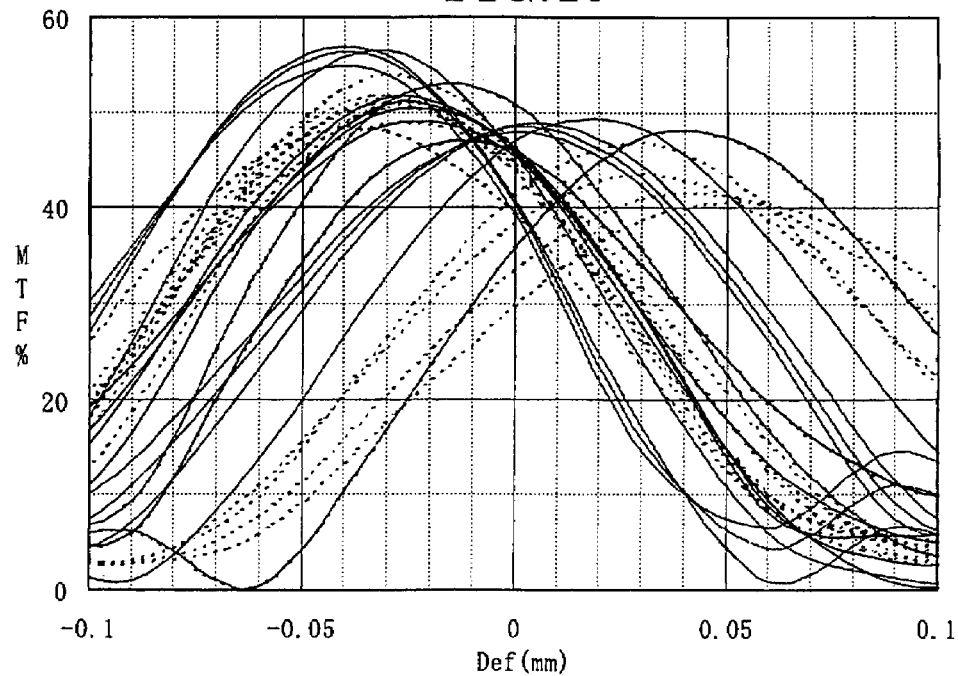
FIG. 10 is a diagram illustrating M-D characteristic curves which express MTF characteristics for a lens without a designed surface shape error with respect to wavelength having respective image height ratio of 1.0, 0.9, 0.75 and 0.5.

After an imaging quality with respect to the wavelength characteristics illustrated in FIG. 12 is calculated, a characteristic curve of MTF characteristic having a designed value without the surface shape error with respect to the wavelength characteristic is illustrated in FIG. 10. An image height ratio of 1.0, 0.9, 0.75 and 0.5 for each of the 3 elementary colors is overlapped with a defocus, respectively.

In FIG. 10, the lateral axis represents a defocus value and the vertical axis represents a MTF value. When the imaging lens is used as the image reading apparatus, a wider radial defocus interval in the middle of the M-D characteristic curve is preferred to counteract a mechanically irregular variation, or an electrically irregular variation for the image reading apparatus.

Figure 11:
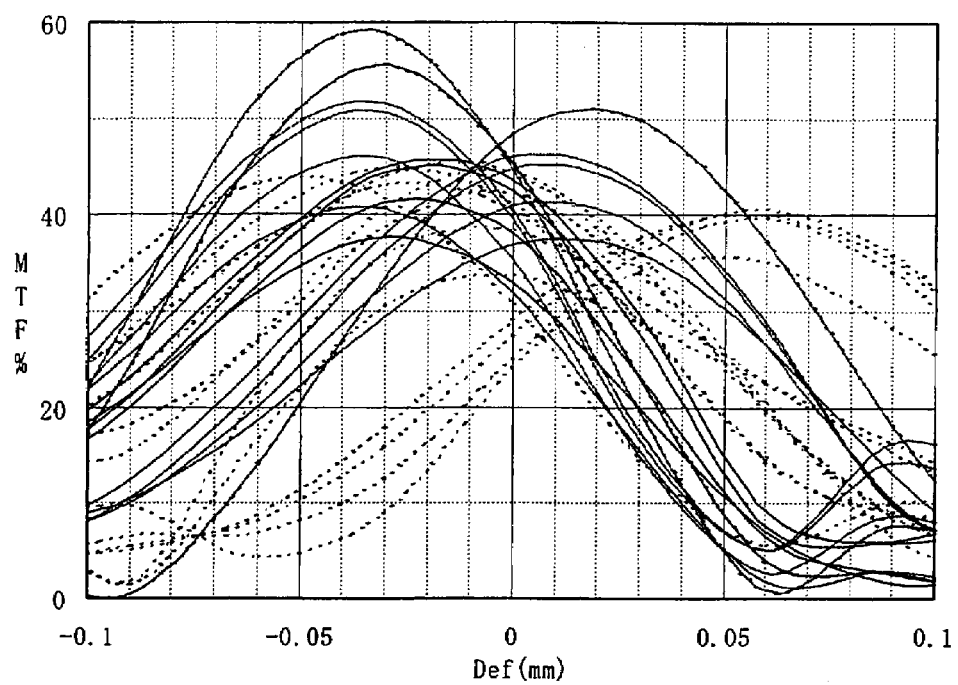
FIG. 11 is a diagram illustrating M-D characteristic curves for the 8$^{th}$ aspherical lens surface illustrated in FIG. 9.

If the surface shape error illustrated in FIG. 9 is obtained from the 8t aspherical surface, an M-D characteristic curve thereof is illustrated in FIG. 11.

In FIG. 11, the lateral axis represents a defocus value and the vertical axis represents a MTF value.

Therefore, when the surface shape error is occurred, a peak value of the composite MTF curve becomes smaller than the designed value and a radial defocus focus, in the middle is also becomes narrower, accordingly it is clear that the M-D characteristics is deteriorated.

A wavelength range used in the image reading apparatus is usually determined by filters disposed at a line CCD. However, as illustrated in FIG. 12, it is common that a wavelength range used in the image reading apparatus is from 0.4 μm to 0.7 μm, thus if a ratio between a surface shape error and a wavelength used is greater than ½, in other words, a convex-concave having a height difference greater than 0.2 μm occurs near a central portion of a lens will deteriorate an imaging quality.

Therefore, for an imaging lens used in an image reading apparatus, it is necessary to control a surface shape error, or a convex-concave height not greater than 0.2 μm.

However, not only a convex-concave height contributes to the imaging quality, but also a convex-concave interval.

Figure 13:
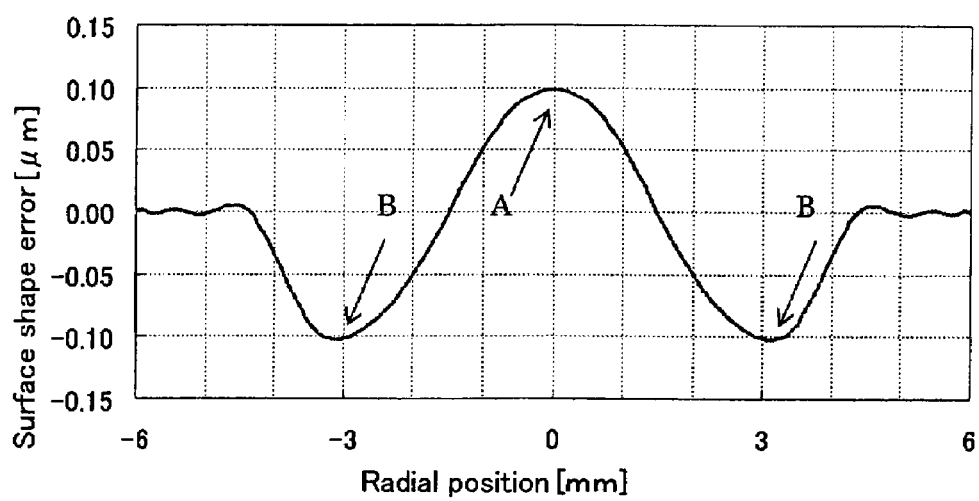
FIG. 13 is a surface shape error characteristic curve illustrating a relationship between a surface shape error on an aspherical lens and a radial position.

When the lens illustrated in FIG. 4 has an aperture diameter of 5.5 mm, its $8^{th}$ aspherical surface, for example, has a convex-concave interval (a distance between A and B) of 3.1 mm and a convex-concave height (an altitude difference between A and B) of 0.2 μm and a diagram for it is shown in FIG. 13. An M-D (MTF-Defocus) characteristic curve thereof is illustrated in FIG. 14.

Figure 14:
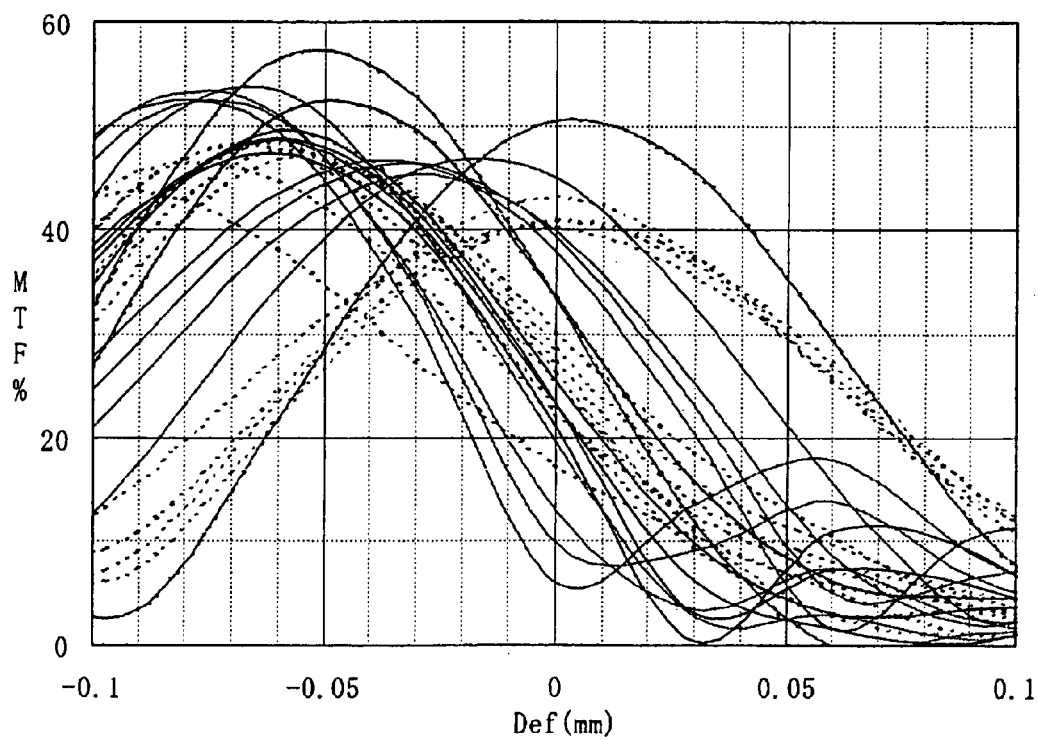
FIG. 14 is an M-D characteristic curve diagram illustrating the lens in FIG. 4 having an aperture stop diameter of 5.5 mm, the 8$^{th}$ aspherical lens surface of the lens with the surface shape error in FIG. 13 having a convex-concave interval of 3.1 mm and a convex-concave height of 0.2 μm.

It is clear by comparing FIG. 14 with FIG. 10 that there is a small decrease on the peak value of MTF. In FIG. 14, a radial defocus interval in the middle is 44 μm at MTF of 20%, comparing with that of 46 μm in FIG. 10. It is obvious that the radial defocus interval in the middle is not remarkably changed with respect to the designed value.

Therefore, it is thought that the surface shape error, in other words the convex-concave interval will not affect the imaging quality of a lens when it is great enough with respect to the aperture stop diameter. The reason thereof is considered to be that there is not a turning point, or a change from a convex to a concave in the surfacer shape within a region where a light flux passes through.

In other words, if a convex-concave interval with respect to a light flux diameter is greater than 0.5, it will almost not affect an imaging quality of a lens. In addition, for a lens disposed adjacent to an aperture stop, the light flux diameter is determined approximately by the aperture stop diameter, thus if a ratio between a convex-concave interval and the aperture stop diameter is greater than 0.5, the convex-concave interval will not affect the imaging quality.

Figure 15:
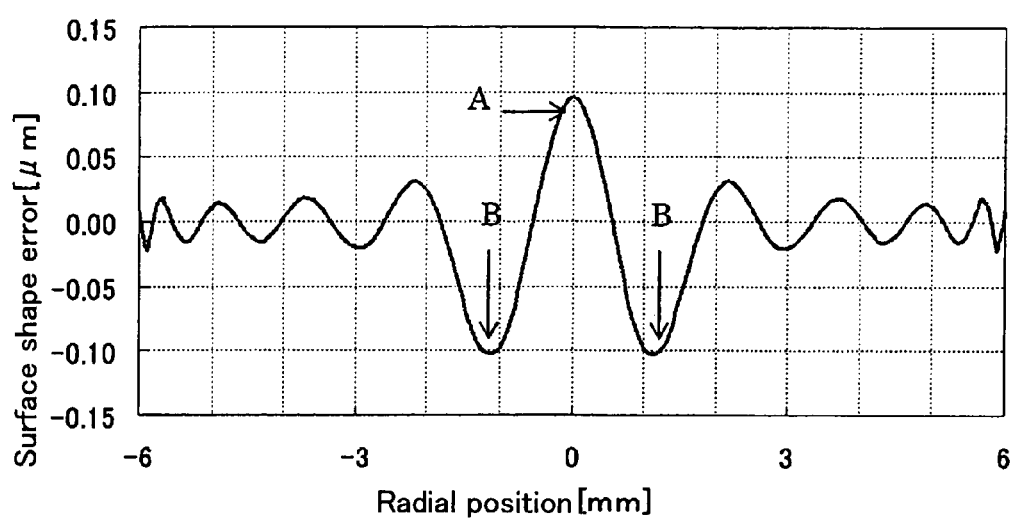
FIG. 15 is a surface shape error characteristic curve illustrating a surface shape error having a convex-concave interval of 1.1 mm and a convex-concave height of 0.2 μm.

FIG. 15 illustrates a characteristic curve which has a narrow convex-concave interval.

In FIG. 15, the convex-concave interval (a distance between A and B) is 1.1 mm, and the convex-concave height (an altitude difference between A and B) is 0.2 μm. An M-D characteristic curve is illustrated in FIG. 16.

Figure 16:
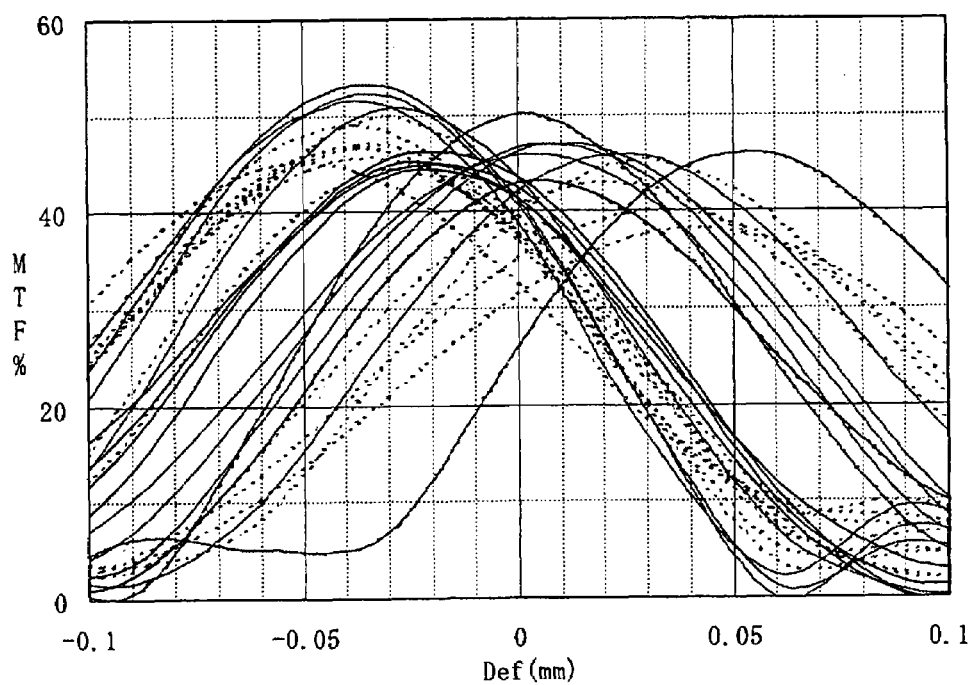
FIG. 16 is an M-D characteristic curve illustrating a surface shape error having a convex-concave interval of 1.1 mm and a convex-concave height of 0.2 μm.

It is clear by comparing FIG. 16 with FIG. 10 that there is a small decrease on the peak value of MTF. In FIG. 16, a radial defocus interval in the middle is 36 μm at MTF of 20%, comparing with that of 46 μm in FIG. 10. The radial defocus interval in FIG. 16 is smaller than that of 44 μm in FIG. 14 but greater than that of 28 μm in FIG. 11. It is obvious that besides a greater convex-concave interval, a narrower convex-concave interval with respect to the aperture stop diameter will not affect the imaging quality.

The reason thereof is that a surface shape error will carry a small affect to a light flux in a whole when the surface shape error is small enough with respect to the light flux diameter.

As described in the above, it is important to control a ratio of a convex-concave interval and the aperture stop diameter not smaller than 0.2.

The example diagram illustrated in FIG. 9 has a ratio of a convex-concave interval and the aperture stop diameter at 0.35 within the range of 0.2 to 0.5.

Figure 17:
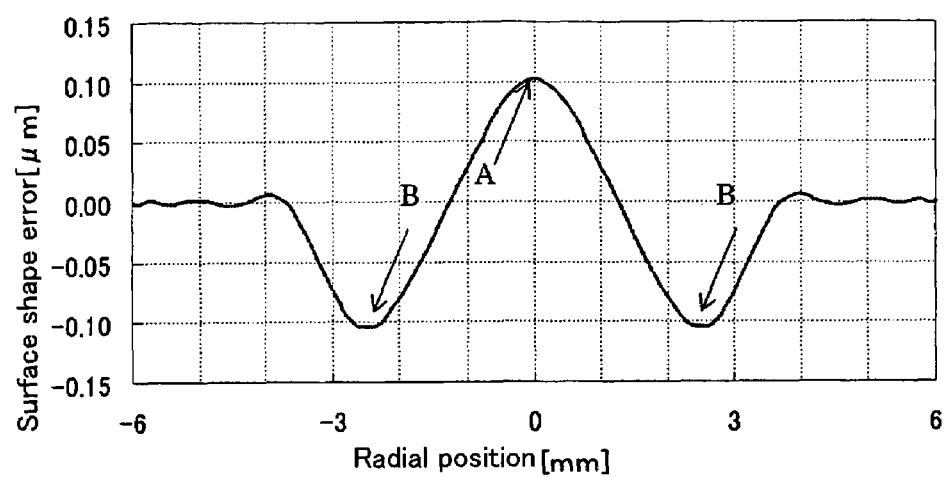
FIG. 17 is a surface shape characteristic curve having a ratio of 0.45 of a convex-concave interval of the surface shape with respect to an aperture stop diameter having a convex-concave interval of 2.5 mm and a convex-concave height of 0.2 μm.
Figure 18:
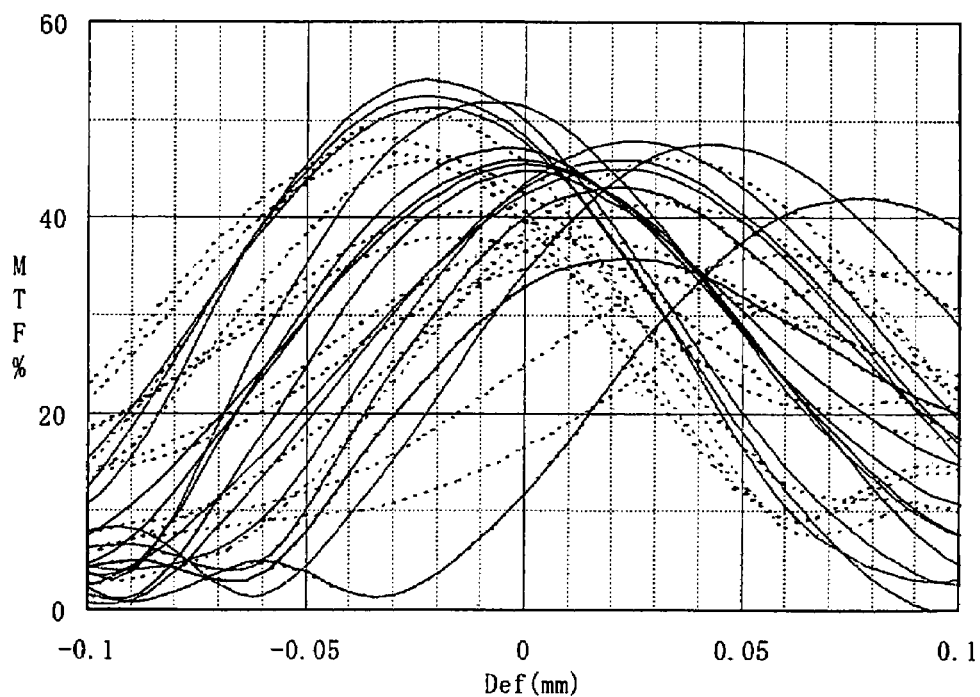
FIG. 18 is an M-D characteristic curve illustrating a surface shape error having a convex-concave interval of 2.5 mm and a convex-concave height of 0.2 μm.

When the lens illustrated in FIG. 4 has an aperture diameter of 5.5 mm, its $8^{th}$ aspherical surface, for example, has a convex-concave interval (a distance between A and B) of 2.5 mm and a convex-concave height (an altitude difference between A and B) of 0.2 μm and a characteristic diagram having a ratio between the convex-concave interval and the aperture stop diameter of 0.45 is shown in FIG. 17. An M-D (MTF-Defocus) characteristic curve thereof is illustrated in FIG. 18.

Figure 19:
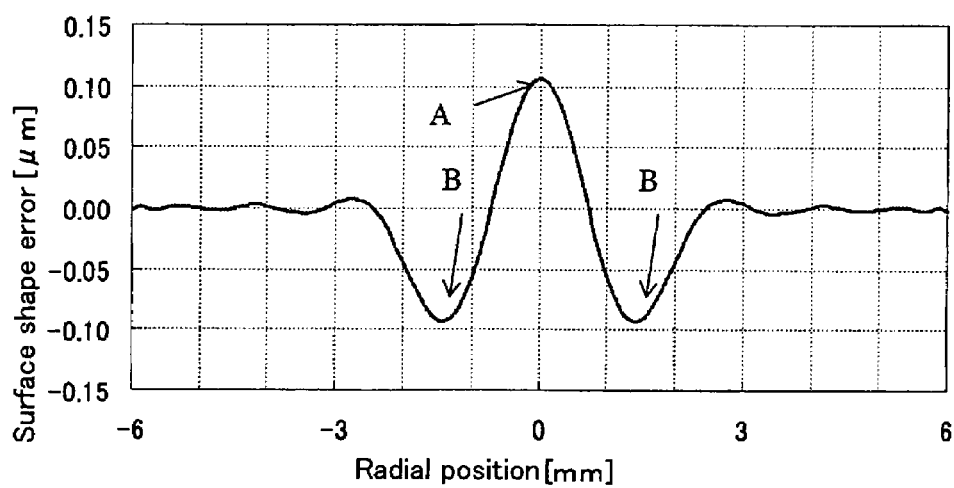
FIG. 19 is a surface shape characteristic curve having a ratio of 0.25 of a convex-concave interval of the surface shape with respect to an aperture stop diameter having a convex-concave interval of 1.4 mm and a convex-concave height of 0.2 μm.
Figure 20:
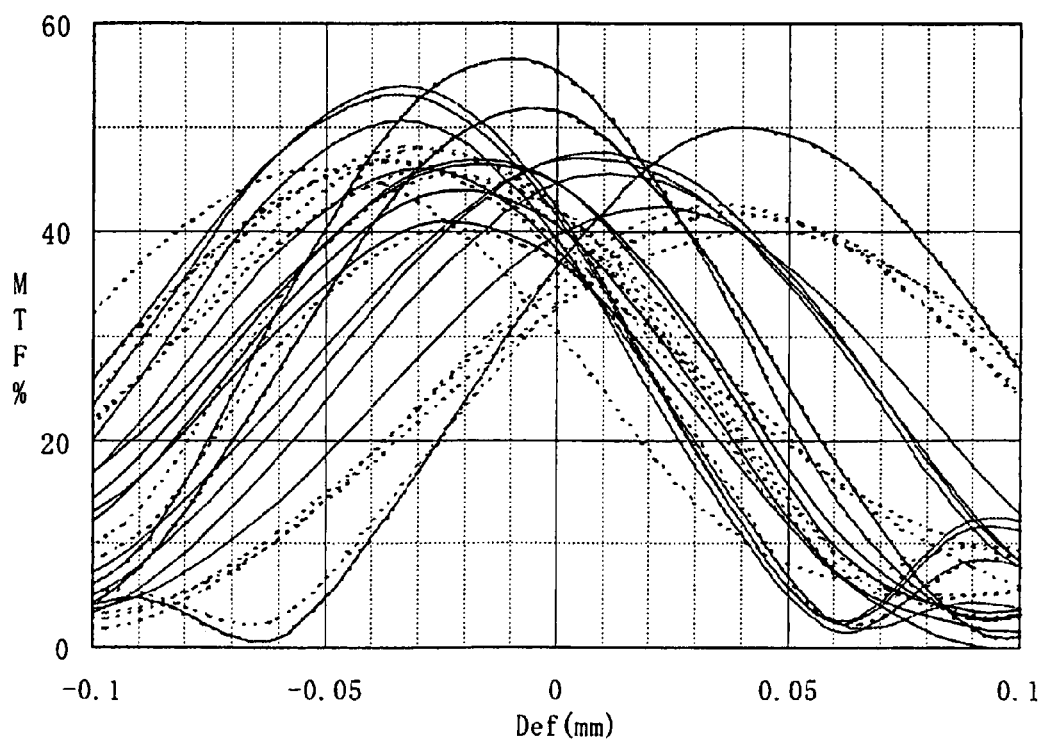
FIG. 20 is an M-D characteristic curve illustrating a surface shape error having a convex-concave interval of 1.4 mm and a convex-concave height of 0.2 μm.

Similarly, FIG. 19 illustrates a characteristic diagram having a convex-concave interval (a distance between A and B) of 1.4 mm and a convex-concave height (an altitude difference between A and B) of 0.2 μm and a characteristic diagram having a ratio between the convex-concave interval and the aperture stop diameter of 0.25. An M-D (MTF-Defocus) characteristic curve thereof is illustrated in FIG. 20.

Each M-D characteristic diagram has an appropriate defocus interval in the middle at an MTF of 20%, thus a lens having the corresponding M-D characteristic diagram may be used as an imaging lens. In each case, when a convex-concave height is further increased, a peak value for MTF will decrease remarkably, and thus it is impossible to assure an appropriate defocus interval.

In each of the above mentioned examples, the $8^{th}$ aspherical surface has a surface shape with a convex in the middle. A similar result may be obtained when the surface shape is reversed, that is with a concave in the middle.

Figure 21:
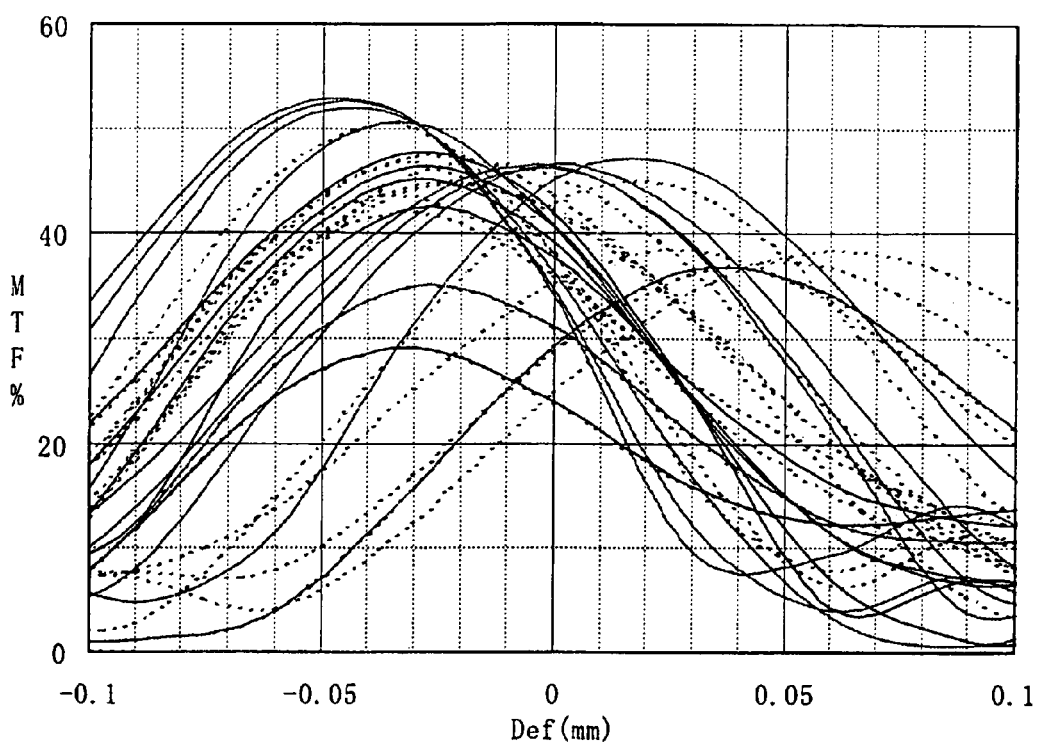
FIG. 21 is an M-D characteristic curve of the imaging lens illustrated in FIG. 4 having the 8$^{th}$ aspherical lens surface with a ratio of 0.25 of a convex-concave interval of the surface shape with respect to an aperture stop diameter and its central portion being a convex.

FIG. 21 illustrates an M-D characteristic curve for the $8^{th}$ aspherical surface of L4 of the imaging lens according the present invention having a ratio between a convex-concave interval and the aperture stop diameter of 0.25. The $8^{th}$ aspherical surface has a surface shape with a convex in the middle, which is vertically reversed from that illustrated in FIG. 19.

Figure 22:
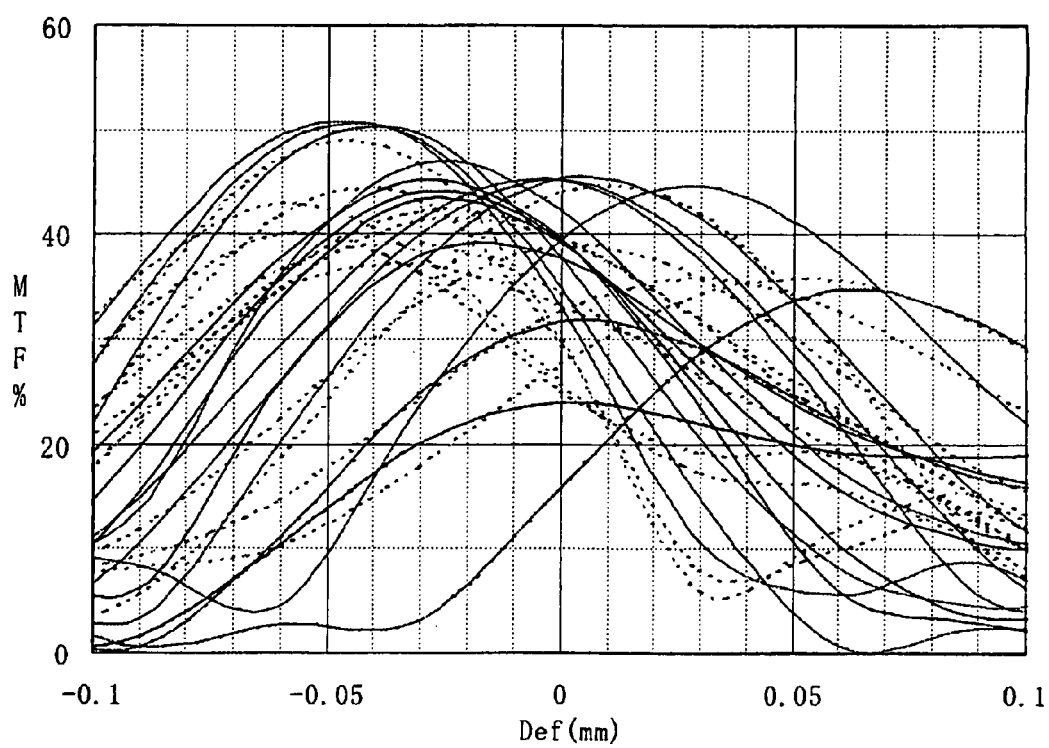
FIG. 22 is an M-D characteristic curve of the imaging lens illustrated in FIG. 4 having the 8$^{th}$ aspherical lens surface with a ratio of 0.38 of a convex-concave interval of the surface shape with respect to an aperture stop diameter and its central portion being a convex.

FIG. 22 illustrates an M-D characteristic curve for the $8^{th}$ aspherical surface of L4 of the imaging lens according the present invention having a ratio between a convex-concave interval and the aperture stop diameter of 0.38. The $8^{th}$ aspherical surface has a surface shape with a convex in the middle, which is vertically reversed from that illustrated in FIG. 9.

Figure 23:
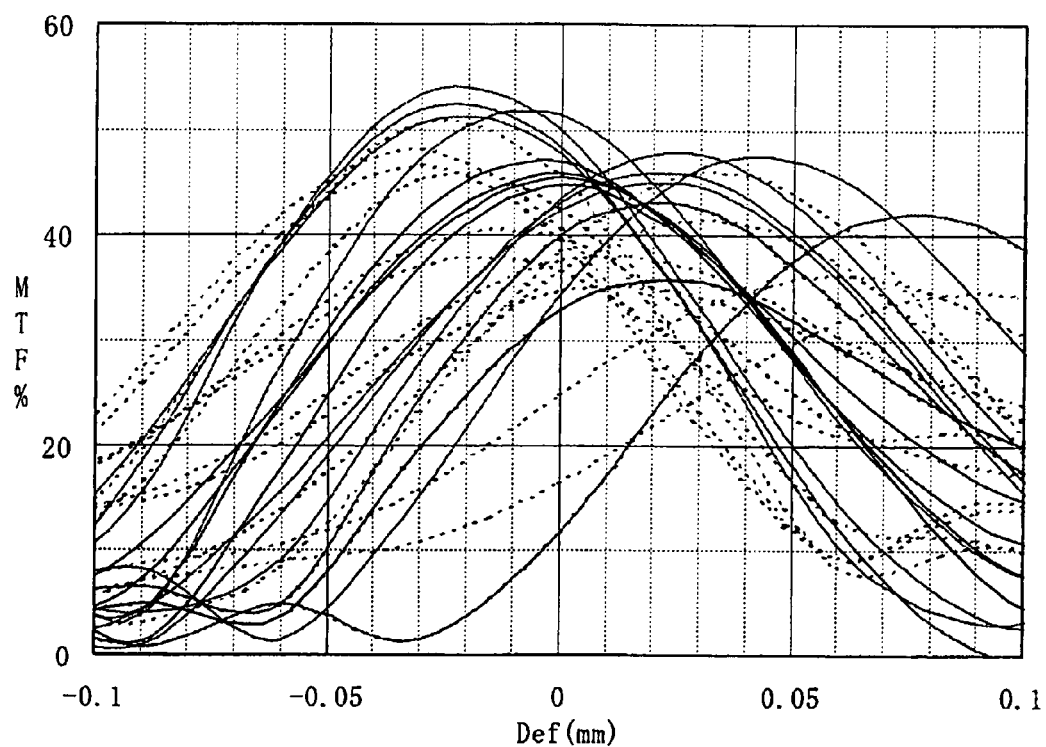
FIG. 23 is an M-D characteristic curve of the imaging lens illustrated in FIG. 4 having the 8$^{th}$ aspherical lens surface with a ratio of 0.38 of a convex-concave interval of the surface shape with respect to an aperture stop diameter and its central portion being a convex.

FIG. 23 illustrates an M-D characteristic curve for the $8^{th}$ aspherical surface of L4 of the imaging lens according the present invention having a ratio between a convex-concave interval and the aperture stop diameter of 0.45. The $8^{th}$ aspherical surface has a surface shape with a convex in the middle, which is vertically reversed from that illustrated in FIG. 17.

Although the lens having a DL/DS ratio of 0.38 as illustrated in FIG. 22 is greatly deteriorated at the MTF characteristics, it still has a radial defocus interval at MTF of 20%, and thus may be used as an imaging lens.

Therefore, it is possible to obtain an imaging lens with a perfect imaging quality by controlling a surface shape error thereof within a range disclosed by the present invention, regardless of a convex-concave shape causing the surface shape error.

An aspherical lens is generally used to counteract a spherical aberration or to correct a curvature of field, which is impossible for a spherical lens, preferably disposed adjacent to an aperture stop. A die is commonly used to mold an aspherical lens, which may cause a convex and/or a concave on the aspherical lens surface, especially at a central portion thereof which deteriorates an imaging quality.

It is possible for such lens to be used as an effective imaging lens if the surface shape error thereof is controlled in a range disclosed by the present invention.

In the above mentioned embodiments, an aspherical lens is described as an example. A spherical lens is also preferred.

In the above mentioned embodiments, an imaging lens having a 3-line CCD is used in an image reading apparatus. It is also preferable to use an imaging lens having 2 dimensional CCD in a photographing apparatus, such as a digital camera.

In the above mentioned embodiments, a $20^{th}$ order even function polynomial is used to describe the surface shape error when a convex-concave interval is short. It does not mean a limitation to the present invention. If a short convex-concave interval is short, an even function polynomial up to $10^{th}$ order is sufficient to evaluate the surface shape error. In such case, it is also preferable to use a $10^{th}$ order even function polynomial.

The above mentioned embodiments of the present invention are illustrative only and not limiting. It will thus be obvious to those skilled in the art that various changes and modifications may be made without departing from this invention in its broader aspects. Therefore, the appended claims encompass all such changes and modifications as falling within the true spirit and scope of this invention.

What is claimed is:

1. An imaging lens comprising:
   a plurality of lenses, and
   an aperture stop,
   wherein a vertical interval between a convex in one direction with respect to a lens surface and a concave in the other direction reverse to the one direction on at least one surface of a lens disposed adjacent to the aperture stop is controlled not greater than ½ with respect to a wavelength in a wave range used, the vertical interval is a surface shape error which is set as a deviation between the lens surface and a proximal spherical surface thereof.

2. The imaging lens set forth in claim 1, wherein for DS and DL which meet a mathematical expression (1):

$$0.2 < DL/DS < 0.5 \quad (1)$$

the vertical interval is controlled not greater than ½ with respect to a wavelength in the wave range used, setting DL as a radial interval between a convex in one direction and a concave in a reverse direction thereto and DS as a diameter of the aperture stop.

3. The imaging lens set forth in claim 1 has a vignetting factor of about 100%.

4. The imaging lens set forth in claim 1, wherein the plural lenses have a 5-lens in 4-group configuration including in an order starting from an object side of the imaging lens a first group having a positive first lens, a second group which has a negative refractive power and is jointed from a positive second lens and a negative third lens, a third group having a negative fourth lens and a fourth group having a positive fifth lens; the aperture stop is disposed between the second group and the third group; and the fourth lens is an aspherical lens having at least one aspherical surface.

5. The imaging lens set forth in claim 1, wherein the lens disposed adjacent to the aperture stop is an aspherical lens having an aspherical surface, and a deviation between the aspherical surface and a proximal spherical surface thereof is set as the surface shape error.

6. The imaging lens set forth in claim 1, wherein the plurality of lenses are glass lenses containing no harmful substances such as lead or arsenic.

7. An image reading apparatus comprises the imaging lens set forth in claim 1 as an image reading lens.

8. An image forming apparatus comprises the imaging lens set forth in claim 1 as an image reading lens.

9. The image reading lens set forth in claim 7 reads a draft image in full color.

10. The image reading lens set forth in claim 8 reads a draft image in full color.

* * * * *